(12) United States Patent
Ishihara et al.

(10) Patent No.: US 10,538,236 B2
(45) Date of Patent: Jan. 21, 2020

(54) CONTROL APPARATUS FOR HYBRID CONSTRUCTION MACHINE

(71) Applicant: Hitachi Construction Machinery Co., Ltd., Taito-ku, Tokyo (JP)

(72) Inventors: Shinji Ishihara, Ushiku (JP); Masatoshi Hoshino, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 306 days.

(21) Appl. No.: 15/526,560

(22) PCT Filed: Mar. 13, 2015

(86) PCT No.: PCT/JP2015/057577
§ 371 (c)(1),
(2) Date: May 12, 2017

(87) PCT Pub. No.: WO2016/147269
PCT Pub. Date: Sep. 22, 2016

(65) Prior Publication Data
US 2017/0320483 A1    Nov. 9, 2017

(51) Int. Cl.
*B60W 20/16*    (2016.01)
*B60W 10/30*    (2006.01)
(Continued)

(52) U.S. Cl.
CPC .............. *B60W 20/16* (2016.01); *B60K 6/48* (2013.01); *B60W 10/06* (2013.01); *B60W 10/08* (2013.01);
(Continued)

(58) Field of Classification Search
CPC .................................................. F01N 3/027
See application file for complete search history.

(56) References Cited

U.S. PATENT DOCUMENTS 8,516,806 B2 *  8/2013  Sujan ..................... B60W 20/16
                                                   60/297
2009/0113874 A1 *  5/2009  McKee ................... F01N 3/027
                                                   60/272
(Continued)

FOREIGN PATENT DOCUMENTS

EP    2 613 031 A1    7/2013
JP    2001-115869 A    4/2001
(Continued)

OTHER PUBLICATIONS

Noma et al., machine-generated English translation of JP 2014-196035, original publication Oct. 16, 2014, 18 pgs. (Year: 2014).*
(Continued)

*Primary Examiner* — Todd M Melton
(74) *Attorney, Agent, or Firm* — Crowell & Moring LLP (57) ABSTRACT

A control apparatus for a hybrid construction machine includes an engine, a motor generator driven by the engine and capable of generating electric power, a hydraulic pump driven by total torque of the engine and the motor generator, a power storage device, an inverter, a filter that collects a particulate material in exhaust gas of the engine, and a control section outputting a command signal for controlling powering operation or regeneration operation of the motor generator. The control apparatus further includes a powering operation limitation section that inputs thereto an ordinary torque command calculated by a torque command value calculation section and a demand signal for regeneration of the filter decided by a filter regeneration decision section and calculates the command signal in response to the input signals. When a filter regeneration demand signal is available, a command signal for limiting the powering operation of the motor generator is calculated.

5 Claims, 8 Drawing Sheets (51) Int. Cl.
  *F01N 9/00* (2006.01)
  *F01N 3/027* (2006.01)
  *B60W 10/26* (2006.01)
  *B60W 10/08* (2006.01)
  *E02F 9/20* (2006.01)
  *F01N 3/023* (2006.01)
  *B60W 10/06* (2006.01)
  *B60W 30/188* (2012.01)
  *B60K 6/48* (2007.10)

(52) U.S. Cl.
  CPC ............ *B60W 10/26* (2013.01); *B60W 10/30* (2013.01); *B60W 30/1886* (2013.01); *F01N 3/023* (2013.01); *F01N 3/027* (2013.01); *F01N 9/002* (2013.01); *B60W 2300/17* (2013.01); *B60W 2510/06* (2013.01); *B60W 2540/00* (2013.01); *B60W 2710/083* (2013.01); *B60W 2710/086* (2013.01); *B60W 2710/242* (2013.01); *B60W 2710/305* (2013.01); *E02F 9/2075* (2013.01); *Y02T 10/54* (2013.01); *Y02T 10/6221* (2013.01); *Y02T 10/6286* (2013.01); *Y10S 903/93* (2013.01)

(56) References Cited

U.S. PATENT DOCUMENTS

| | | |
|---|---|---|
| 2012/0047883 A1 | 3/2012 | Kamiya et al. |
| 2013/0197735 A1* | 8/2013 | Ueno ........................ B60L 3/12 701/22 |
| 2014/0020375 A1 | 1/2014 | Fujishima et al. |
| 2017/0096136 A1* | 4/2017 | Nawata .................. B60K 6/445 |

FOREIGN PATENT DOCUMENTS

| | | |
|---|---|---|
| JP | 2005-120887 A | 5/2005 |
| JP | 2006-275009 A | 10/2006 |
| JP | 2010-127271 A | 6/2010 |
| JP | 2011-169203 A | 9/2011 |
| JP | 2012-47107 A | 3/2012 |
| JP | 2012-137028 A | 7/2012 |
| JP | 2013-24166 A | 2/2013 |
| JP | 2014-196035 A | 10/2014 |

OTHER PUBLICATIONS

International Preliminary Report on Patentability (PCT/IB/338 & PCT/IB/373) issued in PCT Application No. PCT/JP2015/057577 dated Sep. 28, 2017, including English translation of document C2 (Japanese-language Written Opinion (PCT/ISA/237)) previously filed on May 12, 2017 (Nine (9) pages).
International Search Report (PCT/ISA/210) issued in PCT Application No. PCT/JP2015/057577 dated Jun. 16, 2015 with English translation (5 pages).
Japanese-language Written Opinion (PCT/ISA/237) issued in PCT Application No. PCT/JP2015/057577 dated Jun. 16, 2015 (5 pages).
Extended European Search Report issued in counterpart European Application No. 15885367.1 dated Sep. 27, 2018 (eight (8) pages).

* cited by examiner

CONTROL APPARATUS FOR HYBRID CONSTRUCTION MACHINE

TECHNICAL FIELD

The present invention relates to a control apparatus for a hybrid construction machine, and more particularly to a control apparatus for a hybrid construction machine, which includes an engine and a motor generator performing power assist for the engine and power generation, for controlling the power during regeneration of a diesel particulate collection filter.

BACKGROUND ART

There is a hybrid construction machine in which a hydraulic pump and a motor generator are connected to a diesel engine such that a hydraulic actuator is driven by the hydraulic pump while a power storage device is charged by a power generation action of the motor generator and the diesel engine is assisted by an electric action of the motor generator.

In such a hybrid construction machine as described above, a diesel particulate collection filter (hereinafter referred to simply as "filter") is provided as an exhaust gas post-processing device for collecting PM (diesel particle) included in exhaust gas of the diesel engine. If an amount of PM greater than a predetermined level is deposited on the filter, then this causes clogging. Therefore, a process called "filter regeneration" for increasing the catalyst temperature in the filter to a temperature equal to or higher than a predetermined value and maintaining the temperature to burn and remove the deposited PM is performed.

There is also a hybrid type excavator in which, in order to improve the energy efficiency by effectively utilizing the engine output power also when the filter regeneration process is performed, when the stored amount of electricity in a power storage device is smaller than a threshold level, filter regeneration is performed in a state in which the load applied to the diesel engine is increased by a motor generator (for example, refer to Patent Document 1).

Further, there is a parallel hybrid automobile which changes over its traveling mode between motor traveling by electricity and engine traveling by fossil fuel in which, in order to prevent degradation of the purification performance of the catalyst in an engine exhaust path caused by a long time motor traveling, after traveling by the motor is performed for a long time, the traveling is changed over to a special traveling mode in which the hybrid automobile travels only by the engine to increase the temperature of the catalyst rapidly thereby to prevent increase of exhaustion of hazardous materials (for example, refer to Patent Document 2).

Further, there is a warming method for a hybrid type construction machine which is characterized in that, in order to effectively warm an accumulator without using a heating device under a low-temperature environment, when the temperature of the accumulator is lower than a temperature set in advance, the engine is rendered operative to perform warming and the motor generator is rendered operative to charge and discharge the accumulator to cause the accumulator to generate heat (for example, refer to Patent Document 3).

PRIOR ART DOCUMENTS

Patent Documents

Patent Document 1: JP-2013-24166-A
Patent Document 2: JP-2001-115869-A
Patent Document 3: JP-2010-127271-A

SUMMARY OF THE INVENTION

Problem to be Solved by the Invention

Generally, "filter regeneration" in a hybrid construction machine includes two different processes including "continuous regeneration" which is automatically executed during operation of the construction machine without a special operation by the operator and "manual regeneration" which is executed when the PM deposition amount increases continuously due to some reason. The "manual regeneration" requires the operator, for example, "to stop an operation of the hybrid construction machine, operate the gate lock lever upwardly and then depress the filter regeneration switch." Therefore, while "manual regeneration" is performed, the hybrid construction machine is kept in an idle state.

The technology disclosed in Patent Document 1 described above preconditions "manual regeneration," and shows, as a mode of "filter regeneration," an example in which, when there is a margin in the stored amount of electricity in the power storage device, power generation is performed by the motor generator (regenerative operation) to increase the engine load thereby to keep the exhaust gas at a high temperature and another example in which, when the stored amount of electricity in the power storage device is equal to or greater than a predetermined level, while the load when power generation is performed by the motor generator is decreased, the load of the hydraulic pump to be applied to the engine is increased. On the other hand, control of powering operation of the motor generator during filter regeneration and "continuous regeneration" are not mentioned.

Therefore, assist control for the motor generator during "continuous regeneration" becomes indeterminable and, when sufficient power cannot be supplied to the hydraulic pump, the movement of the machine body may become slow and the operator may feel a sense of incompatibility.

Further, for example, if it becomes necessary to perform warming of the power storage device disclosed in Patent Document 3 and "filter regeneration" at the same time, there occurs such problems as described below.

Warming of the power storage device is performed by rendering the motor generator operative to perform charge and discharge. If the motor generator is controlled to perform regeneration to charge the power storage device, then since the stored amount of electricity increases, charge can be performed up to a predetermined value. However, if the motor generator is controlled to perform powering so as to discharge the power storage device, then since the load on the engine decreases, the exhaust gas cannot be maintained at a high temperature. Further, when the charge amount of the power storage device is equal to or greater than a predetermined level, regeneration by the motor generator is difficult. Consequently, the "filter regeneration" may have to be interrupted during warming of the power storage device.

The technology disclosed in Patent Document 2 shows a method of controlling the power of the engine and the power of the motor generator so as to be distributed appropriately against such a problem of "filter regeneration" of the hybrid machine as described above. However, this method is only effective in the hybrid type in which the engine and the motor generator can supply power separately. The method therefore cannot be adopted in a construction machine of the hybrid type which includes a motor generator mechanically connected to an engine since the motor generator cannot supply power by itself and the machine is hard to operate with the engine stopped.

Further, even if the type of Patent Document 2 can be applied to a construction machine in some way, since either the engine or the motor generator can supply power in an ordinary traveling mode and only the engine can in a special traveling mode, sufficient power may not be supplied to the hydraulic pump. As a result, the movement of the machine body may become slow and the operator may feel a sense of incompatibility.

The present invention has been made based on the matters described above, and an object thereof is to provide a control apparatus for a hybrid construction machine which can continue filter regeneration without impairing the operability as far as possible irrespective of a condition of a machine body or a power storage device.

Means for Solving the Problem

To achieve the object described above, a first invention provides a control apparatus for a hybrid construction machine which includes: an engine; a motor generator driven by the engine and capable of generating electric power; a hydraulic pump driven by total torque of the engine and the motor generator; a plurality of hydraulic actuators driven by hydraulic fluid delivered from the hydraulic pump; a power storage device that stores electric power generated by the motor generator and supplies electric power for driving the motor generator; an inverter that performs transfer of electric power between the power storage device and the motor generator; a filter that collects a particulate material in exhaust gas of the engine; and a control section that outputs a command signal to the inverter in order to control powering operation or regeneration operation of the motor generator. The control section includes a filter regeneration decision section that decides a demand for regeneration of the filter, a torque command value calculation section that calculates an ordinary torque command for the motor generator, and a powering operation limitation section that inputs thereto the ordinary torque command for the motor generator calculated by the torque command value calculation section and a demand signal for regeneration of the filter decided by the filter regeneration decision section and calculates the command signal based on the input signals. The powering operation limitation section calculates, when the demand signal for regeneration of the filter is available, a command signal for limiting the powering operation of the motor generator.

Effect of the Invention

With the present invention, when a filter regeneration command is inputted, the powering operation of the motor generator is limited, and therefore, it is possible to maintain or increase the load to be borne by the engine and make it easy to raise/maintain the exhaust gas temperature of the engine. Further, in a situation in which sufficient power cannot be supplied only from the engine, sufficient power can be supplied to the hydraulic pump utilizing the power assist by the motor generator. Consequently, the operability in a normal state can be maintained even during filter regeneration.

MODES FOR CARRYING OUT THE INVENTION

Embodiments of a control apparatus for a hybrid construction machine of the present invention are described below with reference to the drawings.

Embodiment 1

Figure 1:
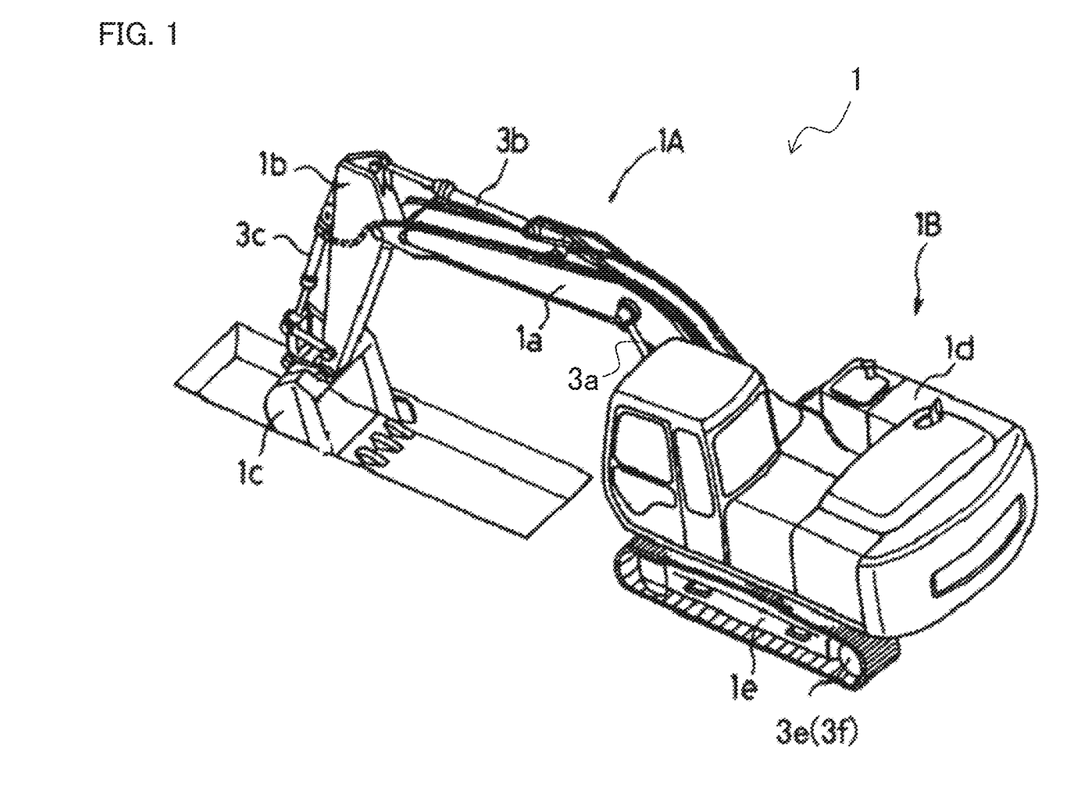
FIG. 1 is a perspective view showing a hybrid excavator including a first embodiment of a control apparatus for a hybrid construction machine of the present invention.
Figure 2:
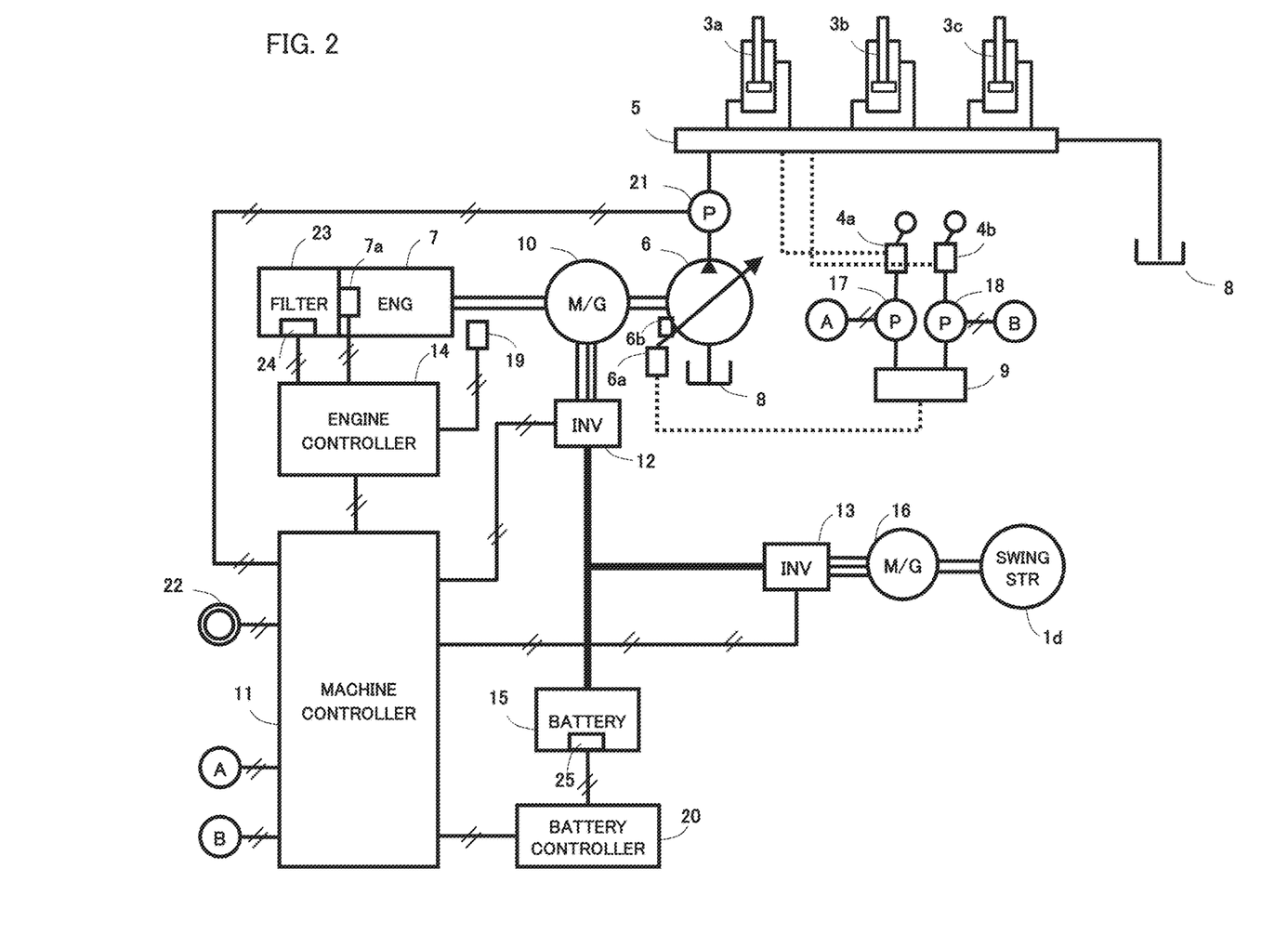
FIG. 2 is a schematic view of an actuator drive system including the first embodiment of the control apparatus for a hybrid construction machine of the present invention.

FIG. 1 is a perspective view showing a hybrid excavator which includes a first embodiment of a control apparatus for a hybrid construction machine of the present invention, and FIG. 2 is a schematic view of an actuator drive system that includes the first embodiment of the control apparatus for a hybrid construction machine of the present invention.

Referring to FIG. 1, a hybrid excavator 1 includes a front implement 1A of the articulated type including a boom 1a, an arm 1b and a bucket 1c individually pivotally movable in a vertical direction, and a machine body 1B having an upper swing structure 1d and a lower track structure 1e. The boom 1a of the front implement 1A is supported at a proximal end thereof for pivotal motion in the vertical direction at a front portion of the upper swing structure 1d. The boom 1a, arm 1b, bucket 1c, upper swing structure 1d and lower track structure 1e are driven by a boom cylinder 3a, an arm cylinder 3b, a bucket cylinder 3c, a swing motor generator 16 (refer to FIG. 2) and left and right track motors 3e and 3f, respectively. It is noted here that the hydraulic actuators 3a to 3c, 3e and 3f which drive the boom 1a, arm 1b, bucket 1c and lower track structure 1e are referred to as hydraulic work unit.

Operation of the boom 1a, arm 1b, bucket 1c and upper swing structure 1d is directed by hydraulic operation signals (controlling pilot pressures) of operation lever devices 4a and 4b (refer to FIG. 2), and operation of the lower track structure 1e is directed by a hydraulic operation signal (controlling pilot pressure) of an operation pedal device for track not shown.

The actuator drive system in the present embodiment shown in FIG. 2 includes a hydraulic drive unit and an electric drive unit. The hydraulic drive unit includes the operation lever devices 4a and 4b, the operation pedal device for track not shown, a directional control valve 5, a hydraulic pump 6 of the variable displacement type, an engine 7, a hydraulic working fluid tank 8, and a shuttle valve block 9.

The operation lever devices 4a and 4b and the operation pedal device decompress a primary pressure generated by hydraulic fluid of a pilot pump not shown to a secondary pressure in response to an operation opening of pressure reducing valves (remotely controlled valves) provided in the operation lever devices 4a and 4b and the operation pedal device to generate a controlling pilot pressure (hydraulic operation signal). The generated controlling pilot pressure (hydraulic operation signal) is sent to a pressure receiving portion of the directional control valve 5 to operate the spool of the directional control valve 5 so as to be changed over from its neutral position.

The directional control valve 5 is a spool valve of the open center type disposed, for example, in a center bypass line and is operated for changeover by a controlling pilot pressure supplied to the pressure receiving portion thereof. Consequently, the directional control valve 5 controls the flow (direction and flow rate) of hydraulic fluid delivered from the hydraulic pump 6 to control driving of the hydraulic actuators 3a to 3c, 3e and 3f. The hydraulic pump 6 is driven to rotate by the engine 7 and a motor generator 10 hereinafter described.

It is noted here that, when a gate lock lever not shown is at an upper position, since the controlling pilot pressure (hydraulic operation signal) described hereinabove is not supplied to the pressure receiving portion of the directional control valve 5, even if an operator operates the operation lever devices 4a and 4b and the operation pedal device, the hydraulic actuator does not operate. The operation lever devices 4a and 4b and operation pedal device and the gate lock lever are collectively referred to as "lever input decision means" in the present embodiment.

To the shuttle valve block 9, a hydraulic operation signal other than a hydraulic operation signal which directs a swing operation out of the hydraulic operation signals (controlling pilot pressures) generated by the operation lever devices 4a and 4b and a hydraulic operation signal generated by the operation pedal device not shown are inputted. The shuttle valve block 9 selects and outputs a hydraulic operation signal that indicates the highest pressure out of the input signals. In a line which connects the operation lever device 4a with the shuttle valve block 9, a pressure sensor 17 for detecting a hydraulic operation signal (controlling pilot pressure) of the operation lever device 4a is provided, and in a line which connects the operation lever device 4b with the shuttle valve block 9, a pressure sensor 18 for detecting a hydraulic operation signal (controlling pilot pressure) of the operation lever device 4b is provided.

The hydraulic pump 6 is a pump of the variable displacement type and has a regulator 6a of the positive control type. To the regulator 6a, a hydraulic operation signal outputted from the shuttle valve block 9 is guided. The regulator 6a of the positive control type increases the swash plate tilting angle (displacement) of the hydraulic pump 6 as the operation amount (demanded flow rate) of the operation levers and the pedal, which are operation members of the operation lever devices 4a and 4b and the operation pedal device, increases to raise the hydraulic operation signal. The delivery flow rate of the hydraulic pump 6 is thereby increased.

Further, the regulator 6a includes a torque limit controlling function for decreasing the swash plate tilting angle (displacement) of the hydraulic pump 6 as the delivery pressure of the hydraulic pump 6 increases such that the absorption torque of the hydraulic pump 6 does not exceed maximum torque set in advance. On the hydraulic pump 6, a tilting angle sensor 6b for detecting the tilting angle (displacement) of the swash plate is provided.

In a delivery line which connects the hydraulic pump 6 with the directional control valve 5, a pressure sensor 21 for detecting a delivery pressure of the hydraulic pump 6 is provided. The hydraulic load can be estimated based on the delivery pressure of the hydraulic pump 6 detected by the pressure sensor 21, and the hydraulic operation signal (controlling pilot pressure) of the operation lever devices 4a and 4b detected by the pressure sensors 17 and 18 or the tilting angle (pump displacement) of the swash plate detected by the tilting angle sensor 6b. These sensors correspond to "load calculation means" in the present embodiment.

The electric drive unit of the actuator drive system in the present embodiment includes a motor generator 10 mechanically connected to the engine 7, a machine controller 11, inverters 12 and 13, an engine controller 14, a battery 15, a swing motor generator 16, a rotational speed sensor 19 for detecting the rotational speed of the engine 7 and a battery controller 21.

The motor generator 10 is mechanically connected between the hydraulic pump 6 and the engine 7. The motor generator 10 has a function as a generator which converts the power of the engine 7 into electric energy (electric power) and outputs the electric energy to the inverter 12 and a function as a motor which is driven by electric energy (electric power) supplied from the inverter 12 to assist driving of the hydraulic pump 6.

The inverter 12 converts, when the motor generator 10 functions as a generator, AC power generated by the motor generator 10 into DC power and outputs the DC power to the battery 15, and converts, when the motor generator 10 functions as a motor, DC power from the battery 15 into AC power and supplies the AC power to the motor generator 10.

The swing motor generator 16 drives and brakes the upper swing structure 1d through a drive mechanism not shown. The swing motor generator 16 has a function as an electric motor which is driven by electric energy (electric power) supplied thereto from the inverter 13 and a function as a generator which converts rotational power upon braking of the upper swing structure 1d into electric energy (electric power) and outputs the electric energy to the inverter 13.

The inverter 13 converts, when the swing motor generator 16 functions as a generator upon braking, regenerated AC power into DC power and outputs the DC power to the battery 15, and converts, when the swing motor generator 16 functions as an electric motor, DC power from the battery 15 into AC power and supplies the AC power to the swing motor generator 16.

It is noted here that, although the present embodiment is configured such that the upper swing structure 1d is driven/braked only by the swing motor generator 16 as shown in FIG. 2, the swing motor generator 16 may be replaced by a hydraulic swing motor which performs driving/braking with hydraulic fluid from the hydraulic pump 6, or a swing device of the electric/hydraulic combination type which uses both of the swing motor generator 16 and a hydraulic swing motor.

The battery 15 supplies electric power to the motor generator 10 and the swing motor generator 16 through the inverters 12 and 13, respectively. Further, the battery 15 stores electric energy generated by the motor generator 10 and the swing motor generator 16. A battery sensor 25 for detecting the voltage, current and temperature of the battery 15 is provided on the battery 15, and signals of a voltage, current and temperature of the battery 15 detected by the battery sensor 25 are inputted to the battery controller 20.

The battery controller 20 estimates an amount of stored electric energy, namely, a remaining amount of electricity, based on detection signals inputted thereto. Further, the battery controller 20 outputs a charge/discharge demanded value to the machine controller 11 as necessary.

The engine controller 14 inputs thereto an actual rotational speed signal of the engine 7 detected by the rotational speed sensor 19 and a target rotational speed signal from the machine controller 11 hereinafter described and calculates a rotational speed deviation. The engine controller 14 calculates a target fuel injection amount based on the rotational speed deviation and outputs a corresponding control signal to an electronic governor 7a provided on the engine 7. The electronic governor 7a is operated by this control signal to inject and thereby supply fuel, amount of which corresponds to the target fuel injection amount, into the engine 7. The target rotational speed is set by an operator using an engine controlling dial 22 at a value suitable for contents of work. A target rotational speed signal set by using the engine controlling dial 22 is inputted to the machine controller 11, and then outputted therefrom to the engine controller 14.

On a line of exhaust gas of the engine 7, a filter 23 is provided as a post-processing device. A differential pressure sensor 24 for detecting a differential pressure of the filter 23 is provided across the filter 23 in the line of exhaust gas. A differential pressure signal of the filter 23 detected by the differential pressure sensor 24 is inputted to the engine controller 14 and outputted also to the machine controller 11. The machine controller 11 estimates a collected PM amount based on the value of the differential pressure signal and decides whether to perform filter regeneration.

The machine controller 11 includes a controlling calculation circuit, and this controlling calculation circuit performs the following four controls relating to the motor generator 10.

(1) Control for Supplying Necessary Power to the Hydraulic Pump 6

When the hydraulic load (pump absorption torque) of the hydraulic pump 6 is so high that sufficient power cannot be supplied only from the power of the engine 7, the machine controller 11 controls the motor generator 10 to perform powering operation to supply sufficient power to the hydraulic pump 6. This assist operation is referred to as power assist. Further, upon recovering from an idle state of the engine 7 or the like, when the actual rotational speed of the engine 7 diverges considerably from the target rotational speed of the engine 7, the motor generator 10 is controlled to perform powering operation to cause the actual rotational speed of the engine 7 to rapidly coincide with the target rotational speed. This assist operation is referred to as acceleration assist.

(2) Control for Smoothing Power of the Engine 7

When the hydraulic load (pump absorption torque) of the hydraulic pump 6 increases steeply, the motor generator 10 is controlled to perform powering operation, and when the hydraulic load (pump absorption torque) of the hydraulic pump 6 decreases steeply, the motor generator 10 is controlled to perform regeneration operation such that the rate of change of the engine power gradually varies. By this control, generation of hazardous materials in the exhaust gas can be suppressed.

(3) Control for Managing the Remaining Amount of Electricity

When the hydraulic load (pump absorption torque) of the hydraulic pump 6 is low and besides the remaining amount of electricity of the battery 15 computed by the battery controller 20 is small, the inverter 12 is controlled to perform regeneration control for causing the motor generator 10 to operate as a generator so as to generate surplus electric power and perform control for storing the generated surplus electric power into the battery 15. On the contrary, when the hydraulic load (pump absorption torque) of the hydraulic pump 6 is high and besides the remaining amount of electricity of the battery 15 computed by the battery controller 20 is equal to or greater than a predetermined amount, the inverter 12 is controlled to supply electric power of the battery 15 to the motor generator 10 to cause the motor generator 10 to operate as an electric motor and assists driving of the hydraulic pump 6.

(4) Control During Filter Regeneration

The machine controller 11 decides whether to perform filter regeneration, and performs, during filter regeneration, various limitation controls for the control contents of (1) to (3) described above.

Figure 3:
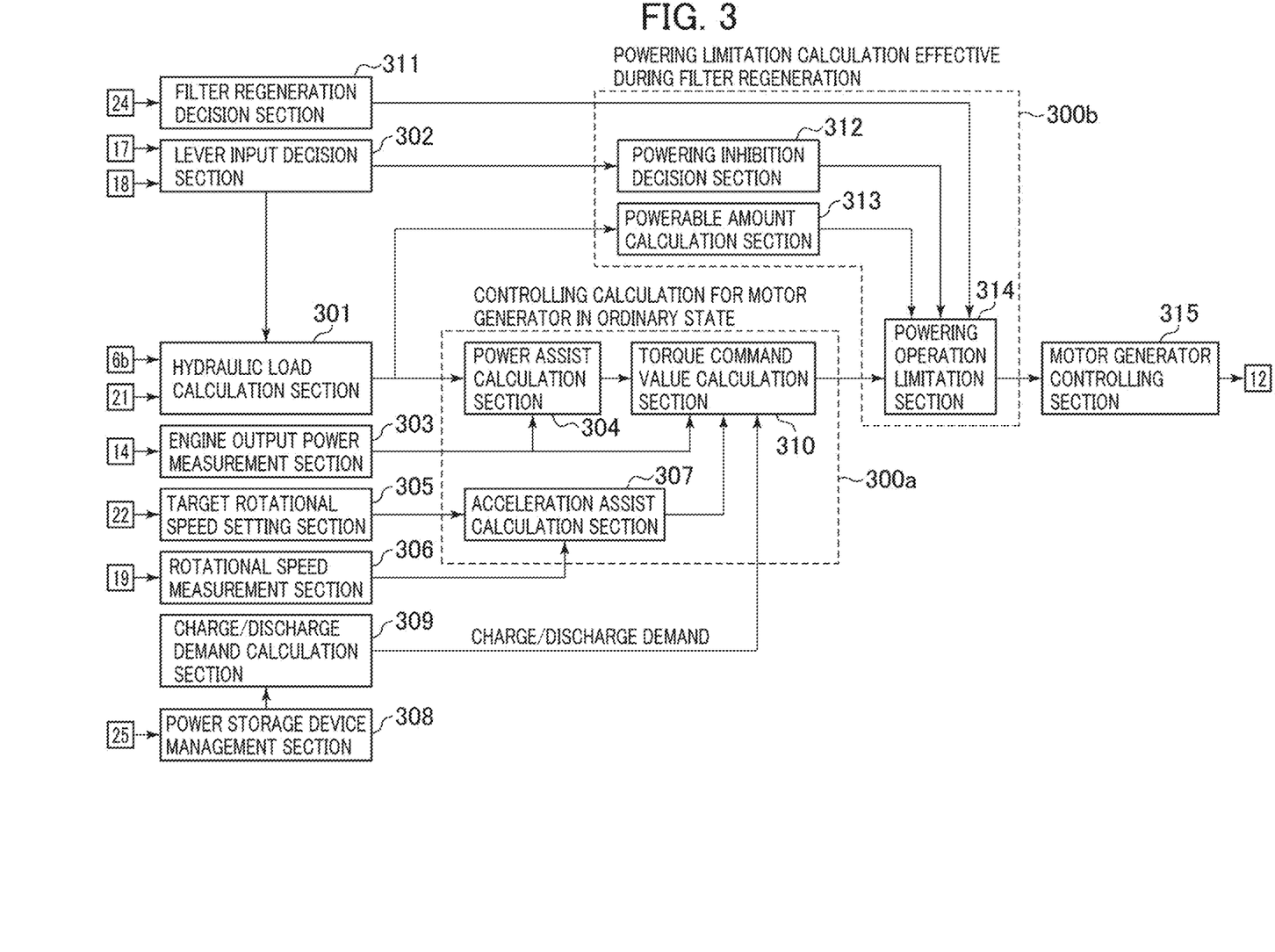
FIG. 3 is a block diagram showing a control system for a motor generator in the first embodiment of the control apparatus for a hybrid construction machine of the present invention.

Now, the controls of (1) to (4) described above relating to the motor generator 10 by the machine controller 11 are described with reference to FIG. 3. FIG. 3 is a block diagram showing a control system for a motor generator in the first embodiment of the control apparatus for a hybrid construction machine of the present invention. In FIG. 3, the elements designated by the same reference characters as in FIGS. 1 and 2 are the same as in FIGS. 1 and 2, and detailed description of them is omitted.

The machine controller 11 comprises 15 calculation sections, and these calculation sections include a calculation group 300a which performs control of a motor generator in a normal state, another calculation group 300b which performs effective powering limitation during filter regeneration, a plurality of calculation sections which calculate signals to be inputted to the calculation groups, and a motor generator controlling section 315 which outputs a command signal to the inverter 12.

First, the "calculation group 300a which performs control of the motor generator in a normal state" which executes (1) the control for supplying necessary power to the hydraulic pump 6, (2) the control for smoothing the power of the engine 7 and (3) the control for managing the remaining amount of electricity described hereinabove is described. The "calculation group 300a which performs control of the motor generator in a normal state" includes a power assist calculation section 304, an acceleration assist calculation section 307 and a torque command value calculation section 310. The plurality of calculation sections which calculate signals to be inputted to the "calculation group 300a which performs control of the motor generator in a normal state" include a hydraulic load calculation section 301, a lever input decision section 302, an engine output power measurement section 303, a target rotational speed setting section 305, a rotational speed measurement section 306, a power storage device management section 308 and a charge/discharge demand calculation section 309.

The hydraulic load calculation section 301 inputs thereto a tilting angle (pump displacement) signal of the swash plate of the hydraulic pump 6 detected by the tilting angle sensor 6b and a delivery pressure signal of the hydraulic pump 6 detected by the pressure sensor 21 and calculates the load of the hydraulic pump 6 from the input signals. It is noted here that the tilting angle signal may be replaced by a target value for the pump displacement based on the lever operation amount from the lever input decision section 302. The computed load signal of the hydraulic pump 6 is outputted to the power assist calculation section 304 and a powerable amount calculation section 313 hereinafter described.

The lever input decision section 302 inputs thereto hydraulic operation signals (controlling pilot pressure) of the operation levers detected by the pressure sensors 17 and 18, an operation amount of the operation pedal not shown, a position signal of the gate lock lever and so forth, and outputs a signal decided from the inputted state signals to the hydraulic load calculation section 301 and a powering inhibition decision section 312 hereinafter described.

The engine output power measurement section 303 measures the load borne by the engine 7 based on a torque signal of the engine 7 and an actual rotational speed signal of the engine 7 outputted from the engine controller 14. The measured load signal borne by the engine 7 is outputted to the power assist calculation section 304 and the torque command value calculation section 310.

The power assist calculation section 304 inputs thereto a load signal of the hydraulic pump 6 computed by the hydraulic load calculation section 301 and a load signal borne by the engine 7 and measured by the engine output power measurement section 303, calculates a shortage in power to be supplied to the hydraulic pump 6 from a deviation between the input signals and computes powering power (powering torque) to be borne by the motor generator 10. A signal of the computed powering power (powering torque) is outputted to the torque command value calculation section 310.

The target rotational speed setting section 305 inputs thereto a target rotational speed signal set by the operator through the engine controlling dial 22 and sets an engine target rotational speed in response to the target rotational speed signal. The set engine target rotational speed signal is outputted to the acceleration assist calculation section 307.

The rotational speed measurement section 306 inputs thereto and utilizes an actual rotational speed signal of the engine 7 detected by the rotational speed sensor 19 and outputted from the engine controller 14. Otherwise, the rotational speed measurement section 306 may utilize a motor rotational speed signal to be used for control of the motor generator 10. The measured rotational speed measurement signal is outputted to the acceleration assist calculation section 307.

The acceleration assist calculation section 307 inputs thereto an engine target rotational speed signal set by the target rotational speed setting section 305 and an actual rotational speed signal of the engine 7 measured by the rotational speed measurement section 306 and computes powering power (powering torque) to be borne by the motor generator 10 such that the deviation between the input signals is eliminated. It is noted here that, in the case where the actual rotational speed signal of the engine 7 is in a state in which it is higher (over revolution) than the target rotational speed signal, the acceleration assist calculation section 307 commands not powering operation but regeneration operation such that the over revolution state is eliminated early. For such calculations, PI control may be used or a torque table determined with respect to the deviation may be used. A signal of the computed powering power (powering torque) is outputted to the torque command value calculation section 310.

The power storage device management section 308 performs measurement of the remaining amount of electricity or the temperature computed by the battery controller 20 based on signals of a voltage, current and a temperature of the battery 15 detected by the battery sensor 25. The signals of the measured remaining amount of electricity, temperature and so forth are outputted to the charge/discharge demand calculation section 309.

The charge/discharge demand calculation section 309 inputs thereto signals of a remaining amount of electricity, a temperature of the battery 15 and so forth measured by the power storage device management section 308 and calculates a charge/discharge demand based on the signals. The basic operation of the charge/discharge demand calculation section 309 is that, when the remaining amount of electricity at present is smaller than a target remaining amount of electricity, a charge demand is outputted, and when the remaining amount of electricity at present is greater than the target remaining amount of electricity, a discharge demand is outputted. Further, where a lithium ion battery which exhibits an extremely low output characteristic at a very low temperature is used as the battery 15, the charge/discharge demand calculation section 309 may change over the charge demand as necessary in order to execute control for repeating charge and discharge to urge temperature rise by self-heating of the battery 15. The computed charge/discharge demand signal is outputted to the torque command value calculation section 310.

The torque command value calculation section 310 inputs thereto a signal of powering power (powering torque) computed by the power assist calculation section 304, a load signal borne by the engine 7 and measured by the engine output power measurement section 303, a signal of powering power (powering torque) computed by the acceleration assist calculation section 307 and a charge/discharge demand signal computed by the charge/discharge demand calculation section 309 and calculates a torque command value to the motor generator 10 based on the input signals. The computed torque command value is outputted to a powering operation limitation section 314 hereinafter described.

Now, the "calculation group 300b which performs effective powering limitation during filter regeneration" for executing (4) control during filter regeneration described hereinabove is described. The "calculation group 300b which performs effective powering limitation during filter regeneration" includes the powering inhibition decision section 312, powerable amount calculation section 313 and powering operation limitation section 314. The plurality of calculation sections which calculate signals to be inputted to the "calculation group 300b which performs effective powering limitation during filter regeneration" includes the hydraulic load calculation section 301, the lever input decision section 302 and a filter regeneration decision section 311.

The filter regeneration decision section 311 inputs thereto a differential pressure signal of the filter 23 detected by the differential pressure sensor 24 and decides a filter regeneration demand based on the input differential pressure signal, an elapsed time period from an end of the last filter regeneration and so forth. As described hereinabove, as the filter regeneration demand, there are two different regeneration demands including: a regeneration demand for "continuous regeneration" by which filter regeneration is performed automatically during operation of the hybrid excavator 1 without requesting a special operation by the operator; and a regeneration demand for "manual regeneration" which requires an operation of "stopping an operation of the hybrid excavator 1, raising the gate lock lever and depressing the filter regeneration switch" by the operator. A signal of a filter regeneration demand decided by the filter regeneration decision section 311 is outputted to the powering operation limitation section 314.

The powering inhibition decision section 312 inputs thereto signals decided by the lever input decision section 302 and decides power operation inhibition based on the signals. Specifically, if the gate lock lever is at its upper position or if it is decided that none of the operation lever devices 4a and 4b and the operation pedal device is operated by the operator, then the powering inhibition decision section 312 outputs a command to limit the powerable amount for the motor generator 10 to 0 [Nm]. For a generatable amount, no limitation command is outputted. The limitation command of the powering inhibition decision section 312 is outputted to the powering operation limitation section 314.

The powerable amount calculation section 313 inputs thereto a load signal of the hydraulic pump 6 computed by the hydraulic load calculation section 301 and calculates a powerable amount of the motor generator 10 based on the input signal. A signal of the computed powerable amount is outputted to the powering operation limitation section 314.

Figure 4:
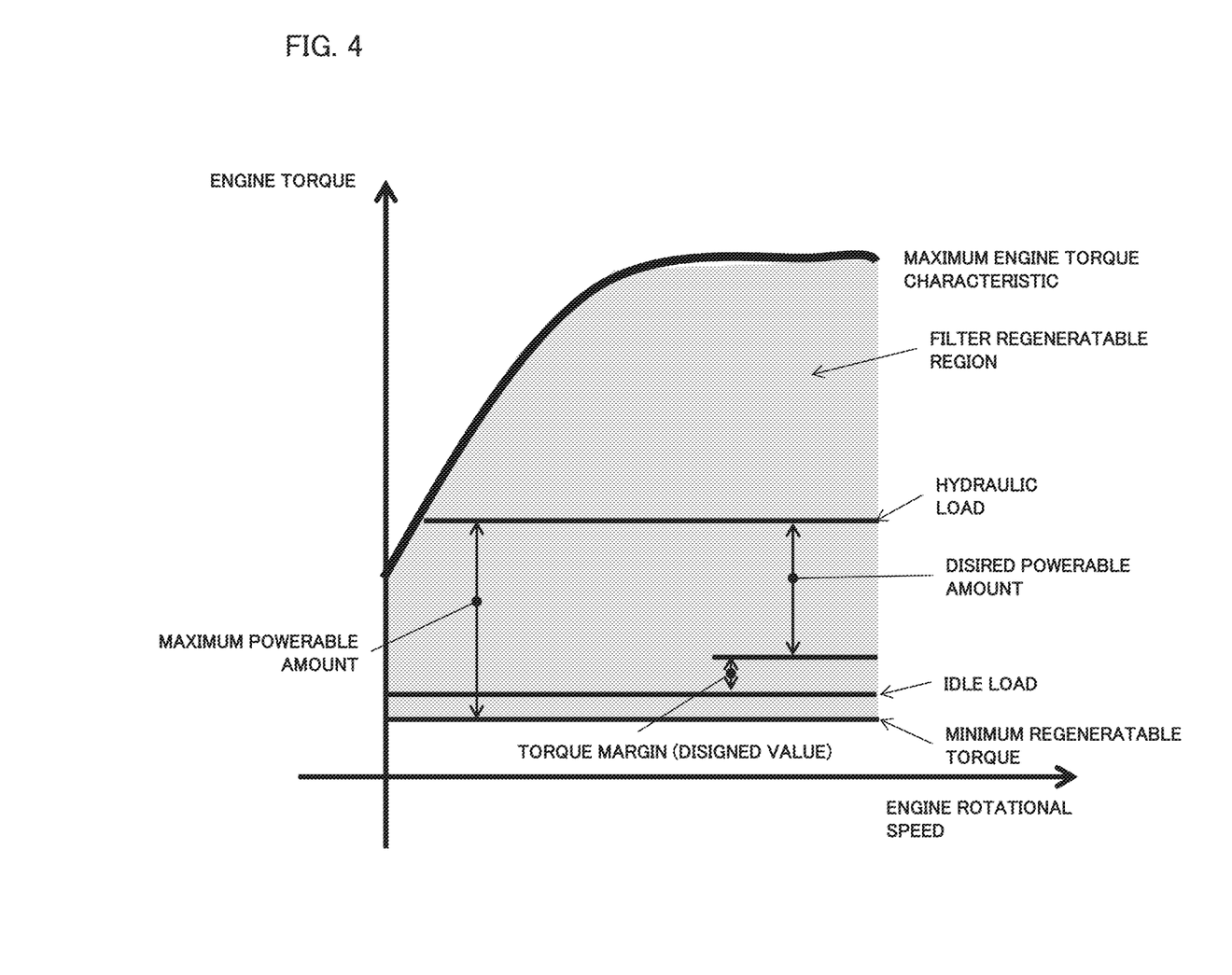
FIG. 4 is a rotational speed-torque map chart illustrating an example of a calculation method by a powerable amount calculation section in the first embodiment of the control apparatus for a hybrid construction machine of the present invention.

A calculation method by the powerable amount calculation section 313 is described with reference to FIG. 4. FIG. 4 is a rotational speed-torque map chart illustrating an example of the calculation method by the powerable amount calculation section in the first embodiment of the control apparatus for a hybrid construction machine of the present invention.

Referring to FIG. 4, the axis of abscissa indicates the engine rotational speed and the axis of ordinate indicates the engine torque. A characteristic of the hydraulic load in FIG. 4 is indicated as one example in the present embodiment. Here, a characteristic of an idle load is a characteristic which depends on the engine 7, and similarly, a characteristic of regeneratable minimum torque indicates a characteristic of minimum torque of the engine 7 with which filter regeneration is possible. A hatched portion surrounded by a maximum engine torque characteristic and the characteristic of regeneratable minimum torque indicates a filter regeneratable region.

In a region having high engine torque in the filter regeneratable region, the exhaust gas temperature is high and regeneration of the filter can be completed in a short time. On the other hand, in another region having low engine torque, the exhaust gas temperature is low and regeneration of the filter takes a long time.

As illustrated in FIG. 4, even in a case in which powering is carried out by the motor generator 10 for the "difference between the hydraulic load and the regeneratable minimum torque (maximum powerable amount)," regeneration of the filter can be maintained, and therefore, a method by which the value (maximum powerable amount) is set as an output of the powerable amount calculation section 313 may be considered applicable. However, since the hydraulic load in the hybrid excavator 1 steeply increases and decreases, if the maximum powerable amount is utilized, the engine torque may become lower than the regeneratable minimum torque.

Accordingly, it is preferable to calculate the output (powerable amount) of the powerable amount calculation section 313 as the "difference between the hydraulic load and the idle load." A more preferable powerable amount is the "difference by subtraction of the sum of the idle load and the torque margin value from the hydraulic load." Consequently, the engine torque can be secured and reliable filter regeneration can be promoted.

It is noted here that, in the hybrid excavator 1 which incorporates an engine which has such a filter regeneratable region as illustrated in FIG. 4, also in a region in which the engine torque is a little lower than the idle load, filter regeneration can be maintained. Therefore, the powering inhibition decision section 312 may not be provided.

Referring back to FIG. 3, the powering operation limitation section 314 inputs thereto a signal for filter regeneration demand decided by the filter regeneration decision section 311 and suppresses the upper limit of the torque command to the motor generator 10 computed by the torque command value calculation section 310 to the powerable amount computed by the powerable amount calculation section 313. Further, if a powering inhibition decision is made by the powering inhibition decision section 312, then the powering operation limitation section 314 limits the powerable amount to 0 [Nm]. The value determined by the powering operation limitation section 314 is outputted as a final torque command for the motor generator 10 to the motor generator controlling section 315.

The motor generator controlling section 315 inputs thereto the final torque command for the motor generator 10 from the powering operation limitation section 314, calculates a command for the inverter 12 for generating torque of the torque command and outputs the computed command signal to the inverter 12.

Figure 5:
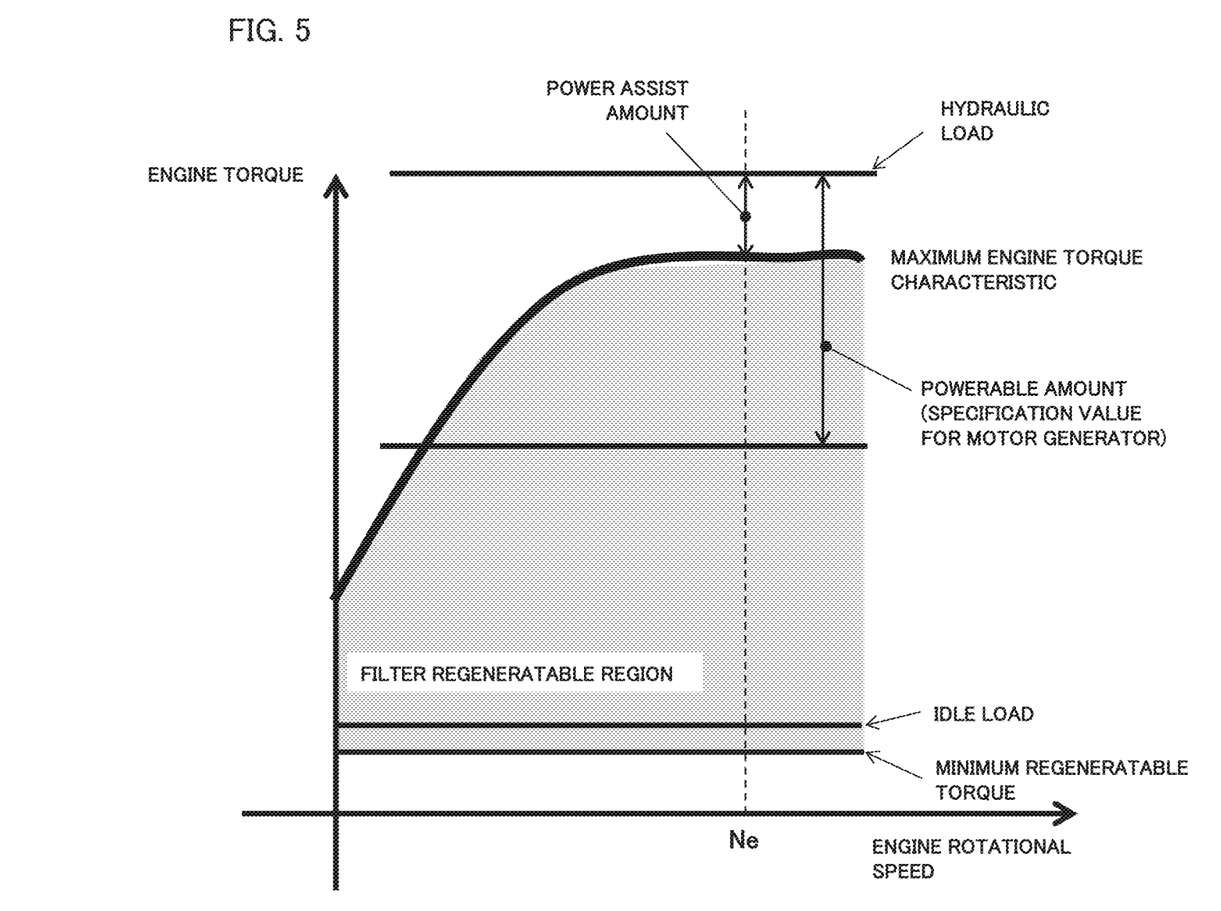
FIG. 5 is a rotational speed-torque map chart illustrating another example of the calculation method by the powerable amount calculation section in the first embodiment of the control apparatus for a hybrid construction machine of the present invention.

Now, a calculation method by the powerable amount calculation section 313 when the hydraulic load is higher than the maximum torque of the engine 7 in the present embodiment is described with reference to FIG. 5. FIG. 5 is a rotational speed-torque map chart illustrating another example of the calculation method by the powerable amount calculation section in the first embodiment of the control apparatus for a hybrid construction machine of the present invention.

Referring to FIG. 5, the axis of abscissa indicates the engine rotational speed and the axis of ordinate indicates the engine torque. A characteristic of the hydraulic load in FIG. 5 is higher than a maximum engine torque characteristic. The other characteristics are similar to those in FIG. 4. In FIG. 5, since the hydraulic load is sufficiently high, the powerable amount computed by the powerable amount calculation section 313 coincides with the maximum torque which depends on the specification of the motor generator 10.

On the other hand, since a signal of the powering power (power assist amount) computed by the power assist calculation section 304 depends on the difference between the hydraulic load and the maximum engine torque, the power assist amount is smaller than the powerable amount. In such a case as just described, since the powering amount is not limited by the powering operation limitation section 314, the motor generator 10 performs powering in accordance with the power assist amount described above.

Since such control as described above is executed, even during filter regeneration, sufficient power can be supplied to the hydraulic pump 6, and therefore, it is possible to avoid the operability of the hybrid excavator 1 from being impaired.

Figure 6:
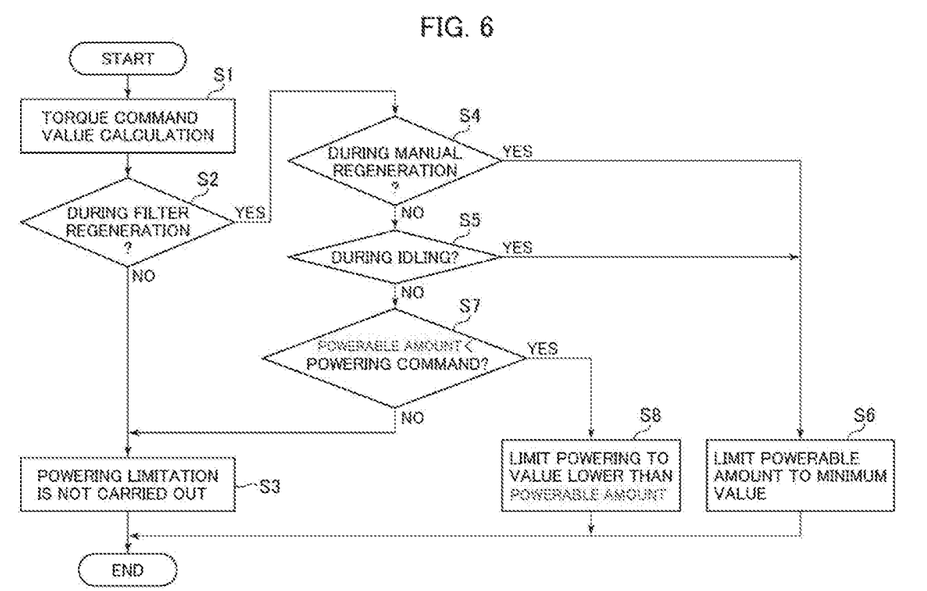
FIG. 6 is a flow chart illustrating a control process of the motor generator during filter regeneration in the first embodiment of the control apparatus for a hybrid construction machine of the present invention.

Now, the (4) control during filter regeneration relating to the motor generator 10 by the machine controller 11 is described with reference to FIG. 6. FIG. 6 is a flow chart illustrating a control process for the motor generator during filter regeneration in the first embodiment of the control apparatus for a hybrid construction machine of the present invention.

The machine controller 11 calculates a torque command value (step S1). Specifically, the torque command value calculation section 310 calculates a torque command value for the motor generator 10 based on various input signals.

The machine controller 11 decides whether or not the filter is being regenerated (step S2). Specifically, since the filter regeneration decision section 311 decides a filter regeneration demand based on a differential pressure signal of the filter 23, an elapsed time period from an end of the last filter regeneration and so forth, the machine controller 11 decides from a result of the decision. If the machine controller 11 decides that the filter 23 is not being regenerated, then the processing advances to (step S3), and in any other case, the processing advances to (step S4).

If it is decided at (step S2) that the filter is not being regenerated, then the machine controller 11 does not carry out powering limitation (step S3). Specifically, limitation by the powering operation limitation section 314 is not performed, and the motor generator 10 is controlled in accordance with the torque command value computed by the torque command value calculation section 310.

On the other hand, if it is decided at (step S2) that the filter is being regenerated, then the machine controller 11 decides whether the regeneration is manual regeneration or continuous regeneration (step S4). Specifically, the filter regeneration decision section 311 decides. If it is decided that the regeneration is manual regeneration, then the processing advances to (step S6), but if it is decided that the regeneration is continuous regeneration, then the processing advances to (step S5).

If it is decided at (step S4) that the regeneration is continuous regeneration, then the machine controller 11 decides whether or not the hybrid excavator 1 is idling (step S5). Specifically, if a lever operation is not carried out for a fixed period of time or if the gate lock lever is at an upper position, then the lever input decision section 302 decides that the hybrid excavator 1 is idling. If it is decided that the hybrid excavator 1 is idling, then the processing advances to (step S6), but if it is decided that the hybrid excavator 1 is not idling (is in load operation), then the processing advances to (step S7).

If it is decided at (step S4) that the regeneration is manual regeneration or if it is decided at (step S5) that the hybrid excavator 1 is idling, then the machine controller 11 limits the powering amount to a minimum value (step S6). Specifically, this corresponds to a case in which the powering operation limitation section 314 inputs thereto a manual regeneration signal from the filter regeneration decision section 311 and another case in which the powering operation limitation section 314 inputs thereto a powering inhibition signal during idling from the powering inhibition decision section 312, and the torque command value from the torque command value calculation section 310 is limited.

If it is decided at (step S5) that the hybrid excavator 1 is not idling (is in load operation), then the machine controller 11 decides whether or not the powering command is higher than the powerable amount (step S7). Specifically, the powerable amount calculation section 313 of the machine controller 11 computes a powerable amount based on the hydraulic load computed by the hydraulic load calculation section 301 and outputs the powerable amount to the powering operation limitation section 314. The powering operation limitation section 314 compares the powering command computed by the torque command value calculation section 310 with the powerable amount (hydraulic load reference) to make a decision. If it is decided that the powering command is higher than the powerable amount, then the processing advances to (step S8), and in any other case, the processing advances to (step S3).

If it is decided at (step S7) that the powering command is not higher than the powerable amount, then the machine controller 11 does not carry out powering limitation (step S3). If this decision is made, then since the torque of the engine 7 can be maintained within the regeneratable region as shown in FIG. 4, the powering limitation is not carried out.

If it is decided at (step S7) that the powering command is higher than the powerable amount, then the machine controller 11 limits the powering command to a value lower than the powerable amount (step S8). Specifically, the powering operation limitation section 314 executes the limitation by limiting the powering command computed by the torque command value calculation section 310 to the powerable amount computed based on the hydraulic load.

With the first embodiment of the control apparatus for a hybrid construction machine of the present invention described above, when a filter regeneration command is inputted, powering operation of the motor generator 10 is limited. Therefore, the load borne by the engine 7 can be maintained or increased, and it is possible to readily raise/keep the exhaust gas temperature of the engine 7. Further, in a situation in which sufficient power cannot be supplied only from the engine 7, sufficient power can be supplied to the hydraulic pump 6 making use of power assist by the motor generator 10. Consequently, the operability in an ordinary state can be maintained even during filter regeneration.

Further, with the first embodiment of the control apparatus for a hybrid construction machine of the present invention described above, in "manual regeneration" which is performed when continuous regeneration of the filter 23 cannot be executed and the PM deposition amount becomes equal to or higher than a predetermined value, the powerable amount of the motor generator 10 is limited to a value equal to or lower than a predetermined value. Therefore, even in manual regeneration which is carried out in an idling state, the load applied to the engine 7 can be maintained to a level equal to or higher than a value with which filter regeneration can be continued. Further, since powering operation of the motor generator 10 is not inhibited completely, even in an idling state during manual regeneration of the filter 23, discharge from a power storage device (battery 15) is allowed. Therefore, it is also possible to perform elimination of overcharge of the power storage device (battery 15), battery warming by self-heating and so forth.

Further, with the first embodiment of the control apparatus for a hybrid construction machine of the present invention described above, since the powerable amount of the motor generator 10 can be set lower than the load of the hydraulic pump 6, load equal to that during idling of the hybrid construction machine can be applied to the engine 7. This makes it possible to avoid regeneration of the filter 23 from being interrupted during continuous regeneration. Further, since the powerable amount of the motor generator 10 is changed in response to the hydraulic pump load, such a situation that the power to be supplied to the hydraulic pump 6 becomes insufficient can be avoided.

Further, with the first embodiment of the control apparatus for a hybrid construction machine of the present invention described above, when there is no lever input by an operator, the powerable amount of the motor generator 10 is limited to a value equal to that during manual regeneration. Thus, filter regeneration in the idling state can be continued regardless of whether it is manual regeneration or continuous regeneration. Consequently, the operability in a normal state can be maintained even during filter regeneration.

Embodiment 2

Figure 7:
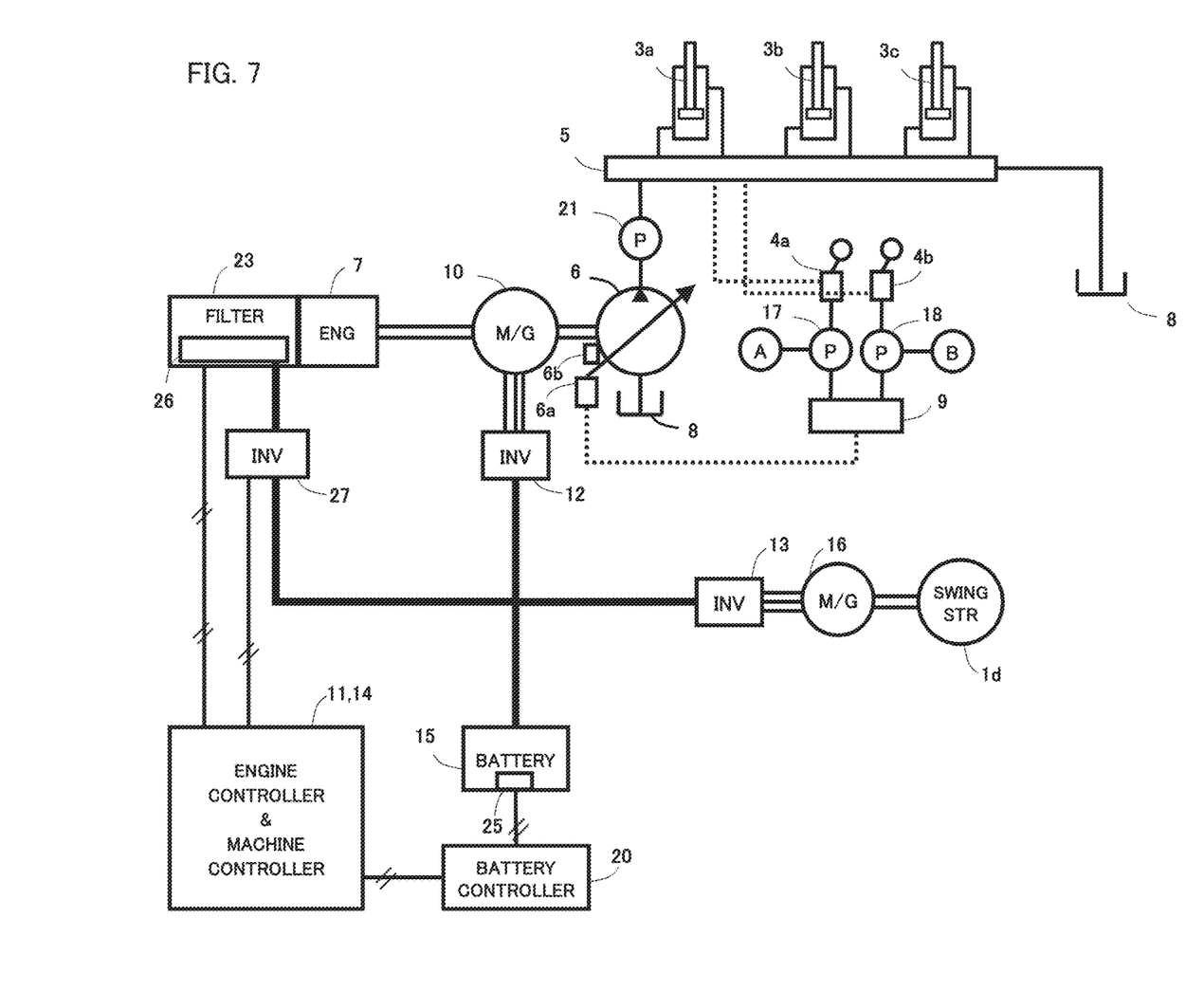
FIG. 7 is a schematic view of an actuator drive system including a second embodiment of the control apparatus for a hybrid construction machine of the present invention.
Figure 8:
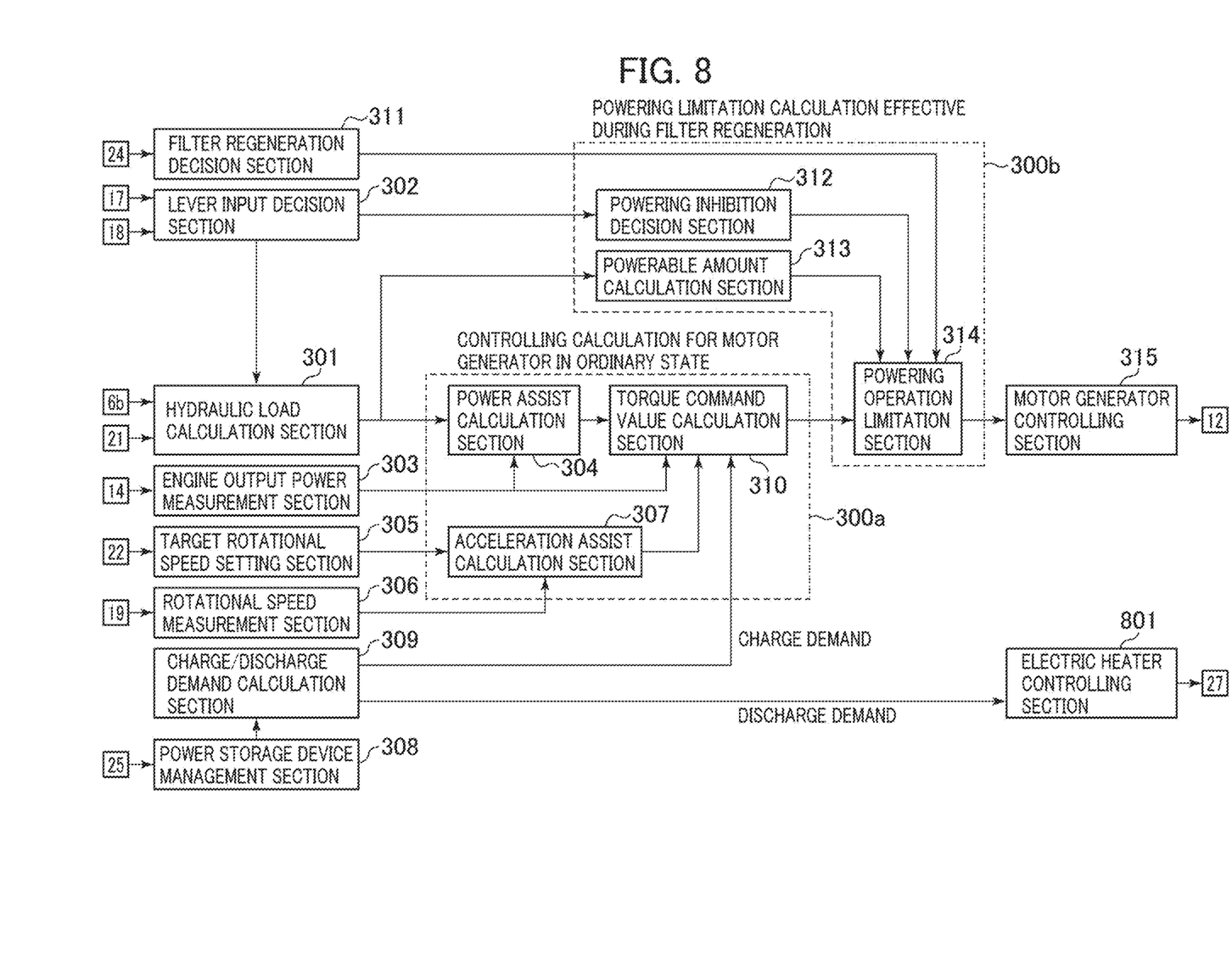
FIG. 8 is a block diagram showing a control system for a motor generator in the second embodiment of the control apparatus for a hybrid construction machine of the present invention.

In the following, a second embodiment of the control apparatus for a hybrid construction machine of the present invention is described with reference to the drawings. FIG. 7 is a schematic view of an actuator drive system including the second embodiment of the control apparatus for a hybrid construction machine of the present invention, and FIG. 8 is a block diagram showing a control system for a motor generator in the second embodiment of the control apparatus for a hybrid construction machine of the present invention. In FIGS. 7 and 8, the elements designated by the same reference characters as in FIGS. 1 to 6 are the same as in FIGS. 1 to 6, and detailed description of them is omitted.

Although the second embodiment of the control apparatus for a hybrid construction machine of the present invention shown in FIG. 7 is generally configured by devices similar to those of the first embodiment, it is different in the following configuration. The present embodiment is different from the first embodiment in that it newly includes an electric heater 26 provided in the proximity of the filter 23 and an inverter 27 which controls electric power to be supplied to the electric heater 26. Specifically, although the second embodiment is configured such that the schematic view of the actuator drive system which includes the first embodiment of the control apparatus for a hybrid construction machine shown in FIG. 2 additionally includes the electric heater 26 and the inverter 27, in FIG. 7, part of signal lines and components are omitted from FIG. 2 in order to avoid the figure from being complicated.

In the present embodiment, the electric heater 26 is utilized to promote filter regeneration by generating heat by electric power generated by the motor generator 10 or electric power supplied from the battery 15 that is a power storage device to raise the temperature of the filter 23.

A control method relating to the motor generator 10 of the machine controller 11 in the present embodiment is described with reference to FIG. 8. Since the control method in the present embodiment is similar to that in the first embodiment, description is given of the elements different from those in the first embodiment with reference to FIG. 8.

In the first embodiment, a charge/discharge demand signal is inputted from the charge/discharge demand calculation section 309 to the torque command value calculation section 310. The present embodiment is different in that only a charge demand signal is inputted from the charge/discharge demand calculation section 309 to the torque command value calculation section 310.

Further, an electric heater controlling section 801 is provided, and a discharge demand signal is inputted from the charge/discharge demand calculation section 309. The electric heater controlling section 801 calculates a command to the inverter 27 in response to the input discharge demand signal and outputs the computed command signal to the inverter 27. Consequently, the electric heater 26 is heated.

As above described, in the present embodiment, since a discharge demand signal from the charge/discharge demand calculation section 309 is not inputted to the torque command value calculation section 310, the discharge demand signal has no influence on the control of the motor generator 10. Accordingly, when the power assist or acceleration assist described hereinabove is unnecessary, the motor generator 10 does not perform powering. Consequently, since the engine torque can always be kept equal to or higher than an idle load, the operating point of the engine 7 can be prevented from going out of a filter regeneratable region.

If a charge demand signal is inputted from the charge/discharge demand calculation section 309 to the torque command value calculation section 310, then since the motor generator 10 performs regeneration operation, the load on the engine 7 increases and the exhaust gas temperature rises, and therefore, the temperature of the filter 23 can be raised. On the other hand, if a discharge demand signal is outputted from the charge/discharge demand calculation section 309, although the motor generator 10 is inoperative, the temperature of the filter 23 can be raised by heating the electric heater 26 through the electric heater controlling section 801 and the inverter 27.

Since a discharge demand and a charge demand from the charge/discharge demand calculation section 309 can be executed without limitation in this manner, warming of the power storage device (battery 15) by self-heating can be executed efficiently. As above described, in the present embodiment, both of regeneration of the filter 23 and warming of the power storage device (battery 15) can be achieved without depending on the remaining amount of electricity of the power storage device (battery 15).

With the second embodiment of the control apparatus for a hybrid construction machine of the present invention described above, similar effects to those of the first embodiment can be achieved.

Further, with the second embodiment of the control apparatus for a hybrid construction machine of the present invention described above, since the engine load increases when the motor generator 10 performs generation operation in response to a charge demand from the power storage device (battery 15), the temperature of exhaust gas can be raised. Further, since the electric heater 26 is fed with power in response to a discharge demand from the power storage device (battery 15), the catalyst temperature of the filter 23 can be raised and kept readily. Consequently, filter regeneration can be performed efficiently.

Further, with the second embodiment of the control apparatus for a hybrid construction machine of the present invention described above, since the motor generator 10 is not caused to perform powering operation in response to a discharge demand from the power storage device (battery 15), the engine load can be kept high, and also the temperature of exhaust gas can be kept high readily. Further, since it is easy to follow a charge/discharge demand to the power storage device (battery 15), battery warming by self-heating can be performed readily.

It is noted here that, as an application of the present embodiment, a second electric heater may be provided for battery warming in addition to the first electric heater for filter regeneration. Configuring the hybrid construction machine in this manner, filter regeneration and warming of the power storage device can be executed more effectively.

It is noted here that the present invention is not limited to the embodiments described hereinabove but includes various modifications. For example, the embodiments described above are explained in detail in order to describe the present invention in a comprehensive way and are not necessarily limited to those which include all constituent elements described hereinabove.

DESCRIPTION OF REFERENCE CHARACTERS

1: Hybrid excavator
3a: Boom cylinder
3b: Arm cylinder

3c: Bucket cylinder
3e, 3f: Left and right track motors
4a, 4b: Operation lever device
5: Directional control valve
6: Hydraulic pump
6a: Regulator
7: Engine
10: Motor generator
11: Machine controller
12, 13, 27: Inverter
14: Engine controller
15: Battery (power storage device)
17, 18: Pressure sensor
19: Rotational speed sensor
20: Battery controller
21: Pressure sensor
22: Engine controlling dial
23: Filter
24: Differential pressure sensor
25: Battery sensor (temperature, current, voltage sensor)
26: Electric heater

The invention claimed is:

1. A hybrid construction machine, comprising:
an engine;
a motor generator driven by the engine and capable of generating electric power;
a hydraulic pump driven by total torque of the engine and the motor generator;
a plurality of hydraulic actuators driven by hydraulic fluid delivered from the hydraulic pump;
a power storage device that stores electric power generated by the motor generator and supplies electric power for driving the motor generator;
an inverter that performs transfer of electric power between the power storage device and the motor generator;
a filter that collects a particulate material in exhaust gas of the engine; and
a controller that outputs a command signal to the inverter in order to control powering operation or regeneration operation of the motor generator, wherein the controller is configured to
decide whether a demand for regeneration of the filter is available,
calculate a load of the hydraulic pump,
calculate a powerable amount of the motor generator based on the load of the hydraulic pump,
calculate a torque command value for the motor generator, and
limit the powering operation of the motor generator when the demand for regeneration of the filter is available and the torque command value is greater than the powerable amount.

2. The hybrid construction machine according to claim 1, further comprising:
a differential pressure sensor that detects a differential pressure of the filter, wherein the controller is configured to
decide whether a manual regeneration demand based on an operation by an operator or a continuous regeneration demand based on the differential pressure signal of the filter is available, and
limit the powering operation of the motor generator to or less than a predetermined value when it is decided that the manual regeneration demand is available.

3. The hybrid construction machine according to claim 2, further comprising:
an operation lever device that directs operation of the plurality of hydraulic actuators, wherein the controller is configured to
decide a state of the operation of the operator based on an operation signal of the operation lever device, and
set the powering operation of the motor generator lower than the powerable amount when it is decided that the continuous regeneration demand is available and it is decided that an operation by the operator is performed.

4. The hybrid construction machine according to claim 1, further comprising:
an operation lever device that directs operation of the plurality of hydraulic actuators wherein the controller is configured to
decide a state of an operation by an operator based on an operation signal of the operation lever device, and
limit the powering operation of the motor generator equal to or lower than a predetermined value when it is decided that the demand for regeneration of the filter is available and that an operation by the operator is not performed.

5. The hybrid construction machine according to claim 1, further comprising:
an electric heater provided in a proximity of the filter;
a second inverter that controls electric power from the power storage device to be supplied to the electric heater; and
a battery sensor that detects a voltage and a temperature of the power storage device, wherein the controller is configured to
calculate a remaining amount of electricity of the power storage device based on the voltage and the temperature of the power storage device detected by the battery sensor,
compute a charge demand signal and a discharge demand signal to the power storage device,
calculate a power command signal to be supplied to the electric heater based on the discharge demand signal,
set an operation of the motor generator to the regeneration operation when the demand for regeneration of the filter is available and besides the charge demand signal is available, and
output the power command signal to be supplied to the electric heater when the demand signal for regeneration of the filter is available and besides the discharge demand signal is available.

* * * * *